(12) United States Patent
Haase et al.

(10) Patent No.: US 12,700,159 B2
(45) Date of Patent: Aug. 4, 2026

(54) METHOD FOR USE IN X-RAY CT IMAGE RECONSTRUCTION

(71) Applicant: KONINKLIJKE PHILIPS N.V., Eindhoven (NL)

(72) Inventors: Christian Haase, Hamburg (DE); Michael Grass, Buchholz in der Nordheide (DE); Thomas Heiko Stehle, Sr., Hamburg (DE); Frank Bergner, Hamburg (DE); Sebastian Wild, Hamburg (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 435 days.

(21) Appl. No.: 18/036,204

(22) PCT Filed: Nov. 4, 2021

(86) PCT No.: PCT/EP2021/080569
§ 371 (c)(1),
(2) Date: May 10, 2023

(87) PCT Pub. No.: WO2022/101077
PCT Pub. Date: May 19, 2022

(65) Prior Publication Data
US 2023/0419563 A1 Dec. 28, 2023

(30) Foreign Application Priority Data
Nov. 12, 2020 (EP) ..................................... 20207202

(51) Int. Cl.
*G06T 7/38* (2017.01)
*G06T 7/33* (2017.01)
*G06T 12/20* (2026.01)

(52) U.S. Cl.
CPC .............. *G06T 12/20* (2026.01); *G06T 7/337* (2017.01); *G06T 7/38* (2017.01);
(Continued)

(58) Field of Classification Search
CPC ......... G06T 11/006; G06T 7/337; G06T 7/38; G06T 2207/10081; G06T 2207/20212;
(Continued)

(56) References Cited

U.S. PATENT DOCUMENTS 6,526,117 B1 * 2/2003 Okerlund ................ G06T 12/10
378/4
6,639,965 B1 10/2003 Hsiek
(Continued)

OTHER PUBLICATIONS

PCT International Search Report, International application No. PCT/EP2021/080569, Jan. 26, 2022.
(Continued)

*Primary Examiner* — Matthew C Bella
*Assistant Examiner* — Andrew B. Jones
(74) *Attorney, Agent, or Firm* — Larry Liberchuk

(57) ABSTRACT

A method for use in image reconstruction of CT projection data, which aims at reducing motion artefacts in reconstructed images caused by movement of anatomical bodies. Embodiments are based on mitigating motion artefacts based on restricting the range of data that is used for reconstructing each slice. More particularly, a sub-range of the projection data corresponding to each slice is selected, this sub-range being chosen based on determining one or more sub-windows of visibility of a target anatomical object or event within the projection data sequence. The event may be a particular phase of a movement cycle of the anatomical body. The structure could be a particular portion of the anatomical body which is of interest. Either approach leads to reduction of motion artefacts within a single slice, by (Continued)

restricting the data range, and focusing upon the data which is most relevant clinically.

13 Claims, 6 Drawing Sheets

(52) U.S. Cl.
CPC ............... *G06T 2207/10081* (2013.01); *G06T 2207/20212* (2013.01); *G06T 2207/30004* (2013.01); *G06T 2210/41* (2013.01)

(58) Field of Classification Search
CPC ....... G06T 2207/30004; G06T 2210/41; G06T 2211/412; G06T 11/005
See application file for complete search history.

(56) References Cited

U.S. PATENT DOCUMENTS

| | | | |
|---|---|---|---|
| 6,879,656 B2 | 4/2005 | Cesmeli | |
| 7,668,390 B2 | 2/2010 | Hier | |
| 8,396,275 B2 | 3/2013 | Bruder | |
| 8,553,962 B2 | 10/2013 | Allmendinger | |
| 8,891,885 B2 * | 11/2014 | Kachelriess | ............. A61B 6/00 |
| | | | 382/232 |
| 9,025,838 B2 * | 5/2015 | Koehler | ................. G06T 12/20 |
| | | | 382/128 |
| 2006/0280283 A1 | 12/2006 | Hsieh | |
| 2009/0074133 A1 | 3/2009 | Nielsen | |
| 2009/0262885 A1 | 10/2009 | Bontus | |
| 2010/0040193 A1 | 2/2010 | Lessick | |
| 2017/0238893 A1 | 8/2017 | Hagiwara | |

OTHER PUBLICATIONS

Mahesh M. et al., "Physics of Cardiac Imaging with Multiple-Row Detector CT", Radio-Graphics, vol. 27, No. 5, pp. 1496-1509, 2007.
Lossau N.et al., "Motion Estimation and Correction in Cardiac CT Angiography Images Using Convolutional Neural Networks", Computerized Medical Imaging and Graphics, vol. 76, 01640, 2019.

* cited by examiner

200

Obtain input projection data for a plurality of slices ⟋202

Identify one or more windows of visibility of anatomical feature or event ⟋204

Based on one or more windows, select sub-range of data for each slice ⟋206

Generate data output indicative of selected sub-range ⟋208

METHOD FOR USE IN X-RAY CT IMAGE RECONSTRUCTION

FIELD OF THE INVENTION

The present invention relates to a method for processing data as part of an x-ray CT image reconstruction process.

BACKGROUND OF THE INVENTION

A conventional computed tomography (CT) scanner includes an x-ray radiation generator mounted on a rotatable gantry opposite one or more x-ray detectors. The x-ray generator rotates around an examination region located between the x-ray generator and the one or more detectors and emits (typically polychromatic) radiation that traverses the examination region and a subject and/or object disposed in the examination region. The one or more detectors detect radiation that traverses the examination region and generate a signal indicative of the examination region and the subject and/or object disposed therein. Data is collected from the array of detectors for each angular position of the x-ray beam relative to the examination region. A platform may move an object to be scanned axially through the examination region as the scan progresses. The collected data from the detectors at the series of angular positions and axial displacements is known as projection data. The projection data refers to the raw detector data, and can optionally be used to form a projection sinogram, the latter being a visual representation of the projection data captured by the detector(s).

A reconstructor is typically further used to process the projection data and reconstruct a volumetric image of the subject or object. The volumetric image is composed of a plurality of cross-sectional image slices which are each generated from the projection data through a process of tomographic reconstruction, such as through application of a filtered back projection algorithm. The reconstructed image data is effectively an inverse radon transform of the raw projection data.

Various organs exhibit natural movement despite the subject remaining outwardly still. These include the heart and the lungs, as well as various organs which are indirectly caused to move due to application of pressure from the lungs or heart.

Motion of internal organs during CT image acquisition leads to blurring and motion artefacts in the tomographic reconstruction. It is therefore beneficial to limit the length of the time window over which the projection data for a given image reconstruction is acquired. State of the art CT scanners are capable of imaging the whole of a given organ (e.g. the heart) in a short space of time.

For example, the whole heart can be imaged in a fraction of a cardiac beat. Such an image acquisition is typically performed during the resting phase of the heart, with minimal motion. Nonetheless, some tomographic slices, typically at the beginning and the end of the acquisition, can be deteriorated by motion.

SUMMARY OF THE INVENTION

The invention is defined by the claims.

According to examples in accordance with an aspect of the invention, there is provided a processing arrangement for use in x-ray computed tomography (CT) reconstruction. The processing arrangement is adapted to receive input projection data comprising a plurality of data subsets, each subset corresponding to a different respective slice through a scanned body. Each data subset comprises data corresponding to a defined range of acquisition angles, and a defined acquisition time period. The processing arrangement is further adapted to identify one or more temporal or angular sub-windows within the input projection data associated with visibility in the input projection data falling within that sub-window, if reconstructed, of a desired anatomical feature or event. The processing arrangement is further adapted to select from the data subset for each slice a temporal or angular sub-range of the data, smaller than a complete range for each slice, wherein selection of the sub-range is based on at least one of the identified one or more temporal or angular sub-windows in the projection data. The processing arrangement is further adapted to generate a data output indicative of the selected sub-range for each slice.

Embodiments of the invention are based on processing a received projection dataset to select from the data for each slice through the scanned body a smaller sub-range of the data, wherein that sub-range is selected based on information regarding one or more windows of visibility of an anatomical feature or event, and potentially also based on the data sub range that is selected in spatially neighboring slices. The anatomical event could be a particular movement phase of an organ or structure which undergoes cyclical movement for example. By selecting only a sub-range of the projection data for each slice, the time period covered by the reconstructed image is reduced, thereby reducing motion artefacts. By selecting the sub-range based on a window of visibility, this ensures the data selected is the most clinically relevant. In the context of the present description the window of visibility in other words can be described as a portion (measured in terms of time and acquisition angle) of the CT projection data set, which includes the most information (compared to the rest of the CT projection data outside of said window) associated with a given anatomy or physiological event. The sub-window may be fully spanned (temporally or spatially) by the relevant anatomical feature or event, in other words the whole of the sub-window may contain or be occupied by data which represents the anatomical feature or event. In some examples, a majority, though not necessarily all, of the sub-window may be occupied by data which represents the anatomical feature or event.

A sub-range is selected of the complete projection data range for each slice. The complete data range for a specific slice in this context means all recorded projection data within the input projection dataset that contains projection rays passing through voxels in said specific slice.

There are different ways of determining the one or more sub-widows of visibility within the projection data set, as will be discussed below. The processing arrangement may include a window selection module which is adapted to apply one or more algorithms to identify the one or more windows of visibility. The windows of visibility may be identified based on use of an external signal related to an anatomical event, or based on a data analysis procedure which analyses the projection data to determine portions of the data which include the anatomical feature or event.

The data subsets for the different slices may be received as a single continuous dataset or data-stream (e.g. in the case of helical imaging), or as separate data packages (e.g. for individual slice scanning). The data subsets may overlap with one another, e.g. in the case of helical imaging. There may be a process of extracting or identifying the data subsets corresponding to each slice from the complete input projection dataset. This may be done by the processing unit or by an external unit.

The identifying of the one or more temporal or angular sub-windows may comprise identifying a respective temporal or angular sub-window for each respective data subset (i.e. for each slice). In this case, optionally, each temporal or angular sub-window may be associated with visibility in the respective data subset, if reconstructed, of a desired anatomical feature or event. However, this is not essential and it may be representative of visibility in a region outside of the sub-range e.g. in case the data subset does not overlap exactly with any sub-window of visibility.

The selecting of the data sub-range for each slice may be based on maximizing temporal alignment of the sub-range with at least one of the windows of visibility. For example, it may be based on maximizing proximity of a central time point of the sub-range with a central time point of the identified window.

The selecting of the data sub-range for each slice may be based on maximizing temporal overlap between the sub-range and at least one of the windows of visibility. It may be additionally or alternatively be based on minimizing non-overlap.

There are different ways of determining the one or more windows of visibility of the anatomical event or object.

In accordance with or more embodiments, the processing arrangement may be arranged to receive a representation of an output signal generated by an external sensor adapted to sense one or more body parameters related to the anatomical event. The received signal corresponds to an output of the sensor over the course of the acquisition of the projection data, i.e. over the course of the CT scan. This may be received in real time as the data is acquired, or it may be a recorded representation of the sensor output recorded over a time period of the data acquisition. The one or more sub-windows associated with visibility of the anatomical event may be determined based on the received signal.

For example, the input signal may be a signal sourced from an ECG sensing arrangement acquired simultaneously with acquisition of the projection data. An ECG sensor signal allows the heart phase over the course of the projection data acquisition to be determined. Based at least in part on this, one or more windows of visibility of a particular heart phase over the course of the data acquisition period may be determined.

Optionally, in accordance with one or more embodiments, the processing arrangement may be adapted to perform a preliminary image reconstruction for one or more of the data subsets. The processing arrangement may be adapted to determine, based on the preliminary reconstruction, a temporal or angular sub-window of the input projection data set within which the anatomical feature or event is visible.

The identified sub-windows would be sub-windows within the full projection data set, which span over one or more of the slices subjected to preliminary reconstruction. The aim is to enable identification of a particular set or range of slices which correspond spatially to the anatomical feature or event (i.e. which contain the feature or event). This then optionally permits in subsequent processing steps, temporally aligning the selected data sub-for that set of slices identified as spanning the anatomical feature or event.

The processing arrangement may be adapted to subsequently apply image processing to the preliminary reconstruction to identify spatial boundaries, edges or outlines of the anatomical feature, or to detect characteristic (e.g. graphical) identifiers of the anatomical event.

In accordance with one or more embodiments, the selected angular sub-range from each slice may have a pre-defined angular width/range, and the selecting the data sub-range for a given data subset comprises determining a temporal alignment of the sub-range within (or relative to) the data subset.

For example, every selected sub-range may have an angular width of x degrees, where x is a number smaller than the total angular range for each data subset (e.g. 180 degrees). The pre-defined width of the sub-range might be 150 degrees out of 180 degrees for example. The process of selecting may simply comprise choosing where, angularly or temporally, to align the sub-range within the complete data range for each subset. For example, it might be temporally aligned with one of the identified windows of visibility of the anatomical object or event. By way of one example, the sub-range may be temporally aligned with an ECG-measured time point corresponding to the target anatomical event.

In accordance with one or more embodiments, determining the temporal alignment of the data sub-range may be based on the signal generated by the external sensor.

In accordance with a further set of embodiments, selecting the data sub-range for one or more of the data subsets comprises determining an angular width of the data sub-range based on one of the one or more determined temporal or angular sub-windows.

It may be determined for example based on a temporal or angular width of at least one of the sub-windows, e.g. one overlapping temporally with the data subset, or temporally closest to the subset. It may be determined based on a duration of a period of visibility of the anatomical feature or event within the data.

In the event that the visibility sub-window is determined based on an input signal from an external sensor, the angular width may be determined based on the temporal width of the sub-window.

In the event that the sub-window is determined based on a preliminary reconstruction, the angular width may be determined based on the spatial width or boundaries of the sub-window.

In accordance with one or more embodiments, the input projection data may be representative of an anatomical object of interest, wherein the object of interest undergoes cyclical movement, and wherein the anatomical event corresponds to a phase of the cyclical movement. By way of example, the object of interest may be the heart or a portion thereof and the anatomical event may be a phase of the heart cycle.

In accordance with one or more embodiments, selecting the data sub-range for each slice may be performed based in part on the data sub-ranges selected for at least a portion of the other slices. By way of example, this could be done with a target of achieving relative temporal overlap or proximity of the sub-ranges selected for each slice.

In some examples this may be done in an iterative process.

In one set of examples, the data sub-range for each slice may be determined based in part on maximizing temporal overlap or temporal proximity of the angular sub-ranges for the different slices. It may be based on minimizing non-overlap. This helps to minimize motion artefacts between slices.

For example, where the input projection data is acquired through helical scanning, the subsets of the projection data will overlap with one another. Thus, it is possible to achieve a degree of temporal and angular overlap in the selected data sub-ranges of the slices. The region or range of overlap may be selected to as to coincide with a region or range of visibility of the anatomical object or event, i.e. with the window of visibility, or to be aligned temporally with a particular anatomical event (e.g. a particular point in a movement cycle).

In accordance with one advantageous set of embodiments, the processing unit may be adapted to:

perform a first image reconstruction of each of the slices using the complete data range of the data subset for each slice to derive a first image for each slice;

perform a second image reconstruction for each of the slices using the extracted sub-range of the data subset for each slice to derive a second image for each slice;

apply low-pass filtering to each of the first images, and apply high pass filtering to each of the second images, and generating a combined image for each slice comprising a combination of the filtered first and second images; and generate an output indicative of the combined image for each slice.

The image reconstructed from the partial data has an improved temporal resolution, but is subject to limited-angle artifacts. Conversely, the image reconstructed from the full data has lower temporal resolution, but is free of limited-angle artifacts. The limited-angle artifacts typically have a significantly lower frequency (i.e. have larger spatial extent) than the motion artifacts. This allows for a combination of both types of images using a frequency-split method comprising adding a low-frequency part of the full-data reconstruction image to a high-frequency part of the partial-data reconstruction image. In this way, artifact types of each image are substantially filtered, and with the filtered image components then compensated by the addition of the other filtered image data. Thus, the temporal resolution is improved, and the limited-angle artifacts are substantially decreased.

In accordance with one or more embodiments, the processing arrangement may be adapted to perform a step of extracting the data sub-range selected for each respective slice from the data subset for the slice. The processing arrangement may further be adapted to perform image reconstruction for each slice using only the extracted data sub-range of the respective data subset for each slice, to thereby generate a reconstructed image for each slice. A data output may be generated representative of the resulting images.

Examples in accordance with a further aspect of the invention provide a computer implemented method for use in x-ray computed tomography image reconstruction, the method comprising:

receiving input projection data comprising a plurality of data subsets, each data subset corresponding to a different respective slice through a scanned body, and wherein each data subset comprises data corresponding to a range of acquisition angles, and an acquisition time period;

identifying one or more temporal or angular sub-windows within the input projection data associated with visibility in the input projection data, if reconstructed, of a desired anatomical feature or event;

selecting from the data subset for each slice a temporal or angular sub-range of the data, smaller than a complete range for each slice, wherein selection of the sub-range is based on at least one of the identified one or more temporal or angular sub-windows in the projection data; and generating a data output indicative of the selected sub-range for each slice.

Examples in accordance with a further aspect of the invention provide a computer program product comprising computer program code, the computer program code being executable on a processor or computer. When the processor or computer is operatively coupled with a source of input projection data, such as a CT imaging apparatus or a datastore, the code is configured to cause the processor to perform a method in accordance with any example or embodiment outlined above or described below, or in accordance with any claim of this application.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying schematic drawings, in which.

DETAILED DESCRIPTION OF THE EMBODIMENTS

Figure 1:
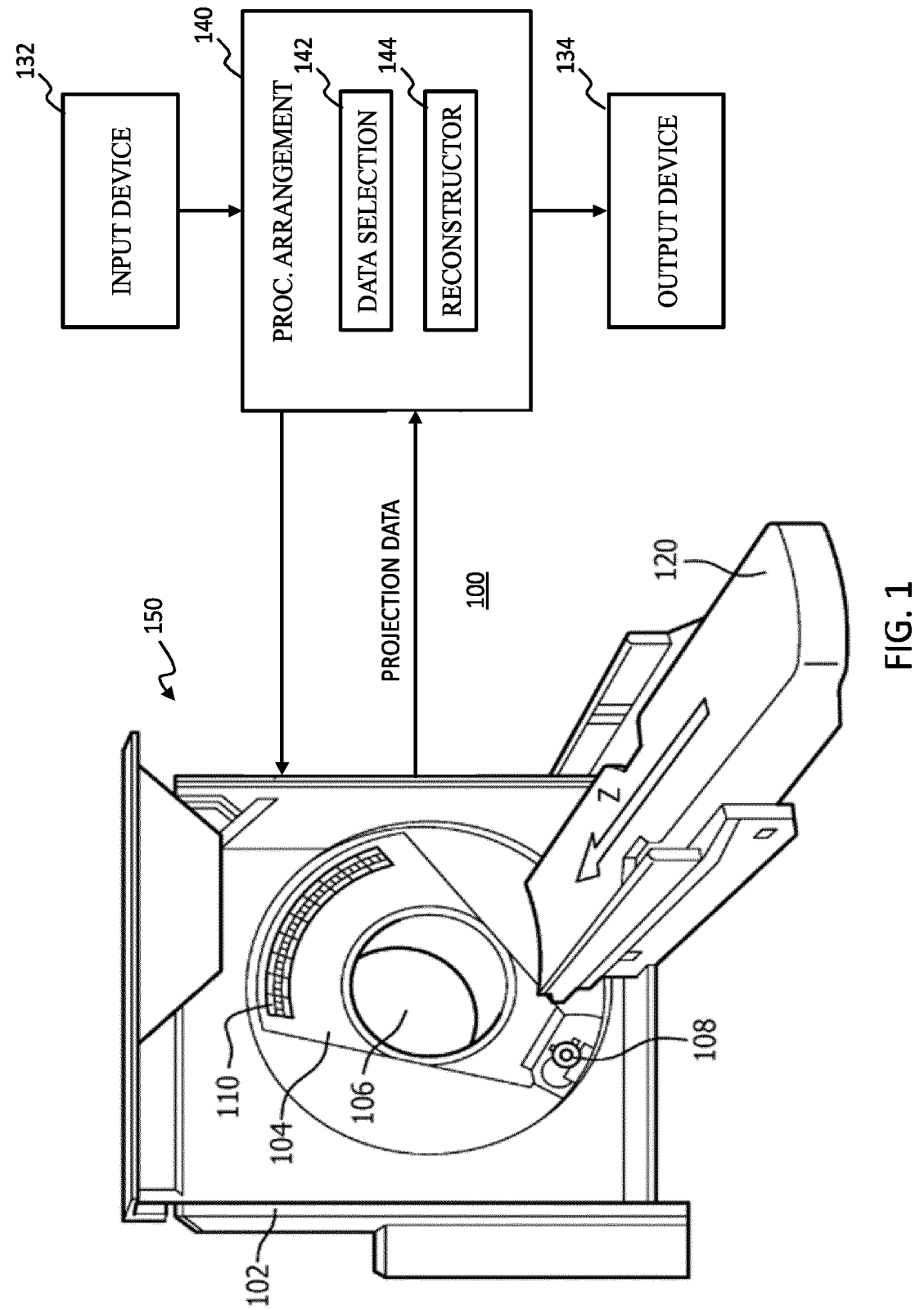
FIG. 1 shows an example processing arrangement in accordance with one or more embodiments, operatively coupled with CT imaging apparatus.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a method for use in image reconstruction of CT projection data, which aims at reducing motion artefacts in reconstructed images caused by movement of anatomical bodies. Embodiments of the invention are based on mitigating motion artefacts based on restricting the range of data that is used for reconstructing each slice. More particularly, a sub-range of the projection data corresponding to each slice is selected, this sub-range being chosen based on determining one or more sub-windows of visibility of a target anatomical object or event within the projection data sequence. The event may be a particular phase of a movement cycle of the anatomical body. The structure could be a particular portion of the anatomical body which is of interest. Either approach leads to reduction of motion artefacts within a single slice, by restricting the data range, and focusing upon the data which is most relevant clinically.

By way of non-limiting example, the selected sub-range of the projection data of each slice may be selected to be temporally as close as possible to the anatomical event, e.g. a specific heart phase such as the resting phase. Additionally or alternatively, the selected sub-range of projection data for a specific one or more slices may selected to be temporally as close as possible to neighboring slices, thus increasing local consistency. Additionally or alternatively, in some examples, the data sub-rage selection may be influenced by the anatomy that is visible in the slices. For example, slices within which a common anatomical structure (such as a coronary artery) is present may be reconstructed from temporally overlapping, aligned, or adjacent projection data. By contrast, for another slice that does not contain the specific anatomical structure, a temporal discontinuity between the projection data sub-singe for this slice, and the data sub-ranges having the anatomical structure, may be acceptable.

FIG. 1 schematically illustrates an example x-ray CT imaging system 100. The system includes a CT imaging apparatus 150, such as a computed tomography (CT) scanner, and further comprises processing and control components 140, 132, 134 operatively coupled to the imaging apparatus.

The imaging apparatus 150 includes a generally stationary gantry 102 and a rotating gantry 104. The rotating gantry 104 is rotatably supported by the stationary gantry 102 and rotates around an examination region about a longitudinal or z-axis.

A patient support 120, such as a couch, supports an object or subject such as a human patient in the examination region. The support 120 is configured to move the object through the examination region in an axial direction (defined by the z-axis), in order to scan different slices through the object.

A radiation source 108, such as an x-ray tube, is rotatably supported by the rotating gantry 104. The radiation source 108 rotates with the rotating gantry 104 and emits radiation that traverses the examination region 106.

A radiation sensitive detector array 110 subtends an angular arc opposite the radiation source 108 across the examination region 106. The detector array 110 includes one or more rows of detectors that extend along the z-axis direction, detects radiation traversing the examination region 106, and generates projection data indicative thereof. Since the detector array includes rows of detectors along the z-axis, this means that for every angular position of the gantry, a plurality of x-ray measurements is acquired at a series of positions along the z-axis. This allows projection data from a single rotation, or portion of a rotation, to potentially be used to reconstruct multiple different slices along the z-axis.

The axial distance through the subject which is covered by the scan is referred to as the scan range. The width of the x-ray beam that is projected through the subject by the source is referred to as the beam collimation. The cross-section area of a given imaged slice through the body is referred to as the field of view (FOV).

The imaging apparatus 150 is operatively coupled to a processing arrangement 140 which comprises one or more processing components. The processing arrangement is arranged to receive the projection data acquired by the imaging apparatus 150 and is adapted to perform one or more processing operations upon the projection data.

In some examples, the processing arrangement may be further adapted to perform a control function, wherein the processing arrangement is adapted to communicate control commands to the imaging apparatus 150 to control one or more operation parameters of the imaging apparatus. By way of example, the system 100 may include one or more user input devices 132, such as a mouse or a keyboard, to permit input of user control commands, and the system may further include a user output device 134 such as a display monitor to communicate system status information to a user, or to display reconstructed images. The user input and output devices may be operatively coupled to the processing arrangement. In further examples however, a separate control console may be provided for controlling operation of the imaging apparatus 150, and wherein the processing arrangement 140 shown in FIG. 1 is only for processing the projection data.

The processing arrangement 140 includes a data selection module 142 which is which is adapted to perform the function of selecting a sub-range of projection data corresponding to each slice through a scanned body. This function will be described in detail further below. Optionally, the processing arrangement may further include a reconstruction module 144 for reconstructing volumetric image data based on the selected data sub-ranges extracted for each slice through the scanned body. Alternatively, the reconstruction module may be provided by a separate processing unit, in operative communication with the processing arrangement and arranged to receive the selected projection data sub-ranges for each of the slices, and to reconstruct image data for each slice based on the extracted data sub-ranges. In either case, the reconstruction module 134 may employ a filtered-backprojection (FBP) reconstruction, a (image domain and/or projection domain) reduced noise reconstruction algorithm (e.g., an iterative reconstruction) and/or other algorithm. It is to be appreciated that the reconstruction module 144 can be implemented through a microprocessor(s), which executes a computer readable instruction(s) encoded or embed on computer readable storage medium such as physical memory and other non-transitory medium. Additionally or alternatively, the microprocessor(s) can execute a computer readable instruction(s) carried by a carrier wave, a signal and other transitory (or non, non-transitory) medium.

With regards to the imaging apparatus 150, this may perform scanning in accordance with any CT imaging protocol. One example scanning protocol is helical or spiral scanning. In spiral CT scanning, the source 108 and detector 110 travel along a helical path relative to the object being scanned. Typical implementations involve moving the patient couch 120 through the bore 106 of the scanner whilst the gantry 104 rotates. Improved image resolution for a given radiation dose can be achieved with spiral CT, compared to individual slice acquisition. Most modern hospitals currently use spiral CT scanners. A helical CT beam trajectory is characterized by its pitch, which is equal to the table 120 feed distance along the scan range (z-axis) over the course of one gantry rotation divided by the section collimation. A pitch of greater than one means that the axial distance traversed over a complete rotation is greater than the beam width at the center of rotation.

For a larger pitch, the radiation dose for a given axial field of view (FOV), i.e. a given slice, is decreased compared to conventional CT (essentially each slice is reconstructed using projection data acquired over a reduced angular range. At high pitches there is, however, a trade-off in terms of noise and longitudinal resolution.

To minimize radiation dose, as well as to improve temporal resolution, one mode of imaging is to use a pitch of 2 (or similar), meaning that at the center of rotation the projection data used to reconstruct each slice, corresponds to data acquired over a rotation range of only 180°. It is noted for reference that the relation between the pitch and the angular range available for reconstruction also depends on the position of a given voxel within a given slice. For voxels at a location coincident with a the center of rotation, a pitch of 2 corresponds to a 180° angular range of data; for voxels away from the center of rotation, a pitch of 2 corresponds to less than 180° of data.

When seeking to image a particular anatomical object which undergoes movement, blurring and motion artefacts can occur in the tomographic reconstructions. Depending upon the scan mode being used, the temporal resolution of a particular image slice (or FOV) is limited to the time required to complete the rotation angular range used for acquiring the data for each slice. For example, in helical imaging, the temporal resolution for a particular slice is limited by the rotation speed of the gantry. If, by way of example, a single source high-pitch mode is used, then the temporal resolution for a given slice may be limited to the temporal range of data which is acquired over half a rotation. Embodiments of the present invention aim to improve temporal resolution based on selecting only a sub-range of the projection data corresponding to each slice (or FOV). This thereby limits the temporal duration over which the utilized projection data for a single slice was acquired. This thereby limits the magnitude of any motion artefacts within a single slice.

One aspect of the invention provides only the processing arrangement 140, the processing arrangement including an input/output for connecting operatively to a CT imaging assembly 150 during use to receive projection data, and optionally for outputting control commands to the CT imaging assembly. In a further aspect, a CT imaging system may be provided which includes both the processing arrangement 140 and the imaging assembly 150.

The forthcoming description relates to features of the processing arrangement. The processing steps performed by the processing arrangement also provide a computer implemented method, which computer implemented method represents a further aspect of the invention.

Figure 2:
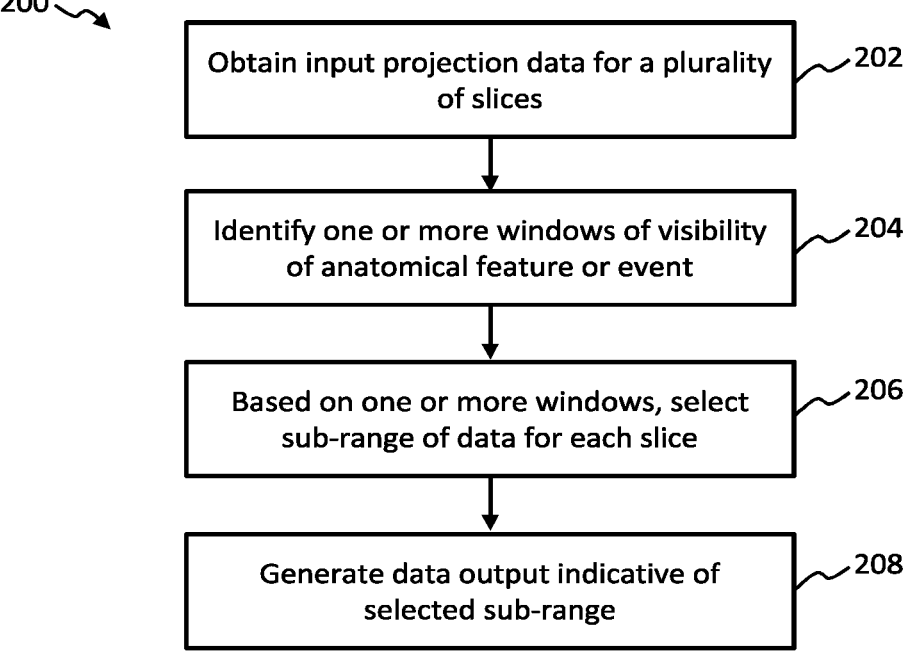
FIG. 2 shows processing steps performed by a processing arrangement according to one or more embodiments.

A basic outline of example processing steps performed by the processing arrangement 140 according to one or more embodiments is presented in FIG. 2.

The processing arrangement 140 is adapted to obtain 202 input projection data comprising a plurality of data subsets, each subset corresponding to a different respective slice through a scanned body. Each data subset comprises data corresponding to a certain range of acquisition angles, and a certain acquisition time period. The data subsets may overlap temporally within the complete projection dataset. In other words, the data subsets for axially neighboring slices may share a common portion of projection data. This would be the case for example where the projection data is data acquired in a spiral or helical scan mode with a pitch of greater than 1. However, in other cases, the projection data subsets may not overlap with one another, for instance when the projection data was acquired in an individual slice acquisition mode. The projection data may be received in real time from a CT scanning apparatus 150, or may be received from a datastore which records data acquired at a previous time. The projection data may be received in the form of a continuous data stream or projection sequence, which comprises projection data spanning a total scan range (along the z-axis) of the scanned object, a total scan duration, and incorporating a plurality of angular rotations. The processing arrangement may be adapted to perform a step of separating (or tagging or labelling) the subsets of the received projection data which correspond to different respective slices. Alternatively, this may be done externally to the processing arrangement, so that the separating or labelling of the different data subsets has already been performed when the data arrives at the processing arrangement.

The processing arrangement 140 is further adapted to identify 204 one or more temporal or angular sub-windows within the input projection data associated with visibility in the input projection data, if reconstructed, of a desired anatomical feature or event. There are different ways of doing this, and it may be based on an input from an external sensor (or a recording of an external sensor output over the time period corresponding to the projection data acquisition) which reflects a property linked with the anatomical event, or it can be based on analysis of the projection data itself to detect windows of object visibility in the data. A respective sub-window of visibility may be identified for each respective slice in some examples. There may be identified a unique sub-window for each and every slice, or some sub-windows may be used for more than one slice (e.g. axially and temporally adjacent slices). This might arise for instance in cases where the data subsets for different slices overlap partially or fully. More explanation in relation to this feature will be expounded in description to follow.

The processing arrangement 140 is further adapted to select 206 from the data subset for each slice a temporal or angular sub-range of the data, smaller than a complete range for each slice, wherein selection of the sub-range is based on at least one of the identified one or more temporal or angular sub-windows in the projection data. For example it may be based on maximizing temporal overlap with, or temporal proximity to, one of the identified sub-windows, for example a temporally closest one of the windows.

The processing arrangement 140 is further adapted to generate a data output indicative of the selected sub-range for each slice. By way of example, the processing arrangement may comprise an input/output, and wherein the data output is communicated to a reconstruction module by means of the input/output. In some examples, the processing arrangement may include the reconstruction module, such that the processing arrangement is adapted to perform a further step of generating reconstructed image data based on the selected data sub-ranges for each of the slices, for instance using filtered back-projection for each slice. This may be compiled to form reconstructed volumetric image data for example.

Figure 3:
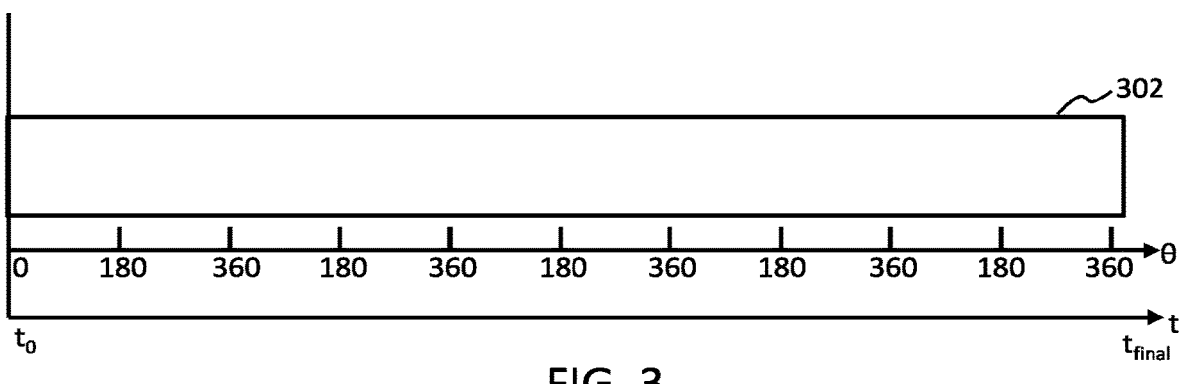
FIG. 3 schematically illustrates (a portion of) an example CT projection dataset, shown with respect to acquisition time and acquisition angle.

For purposes of illustration, and to ease explanation which will follow, FIG. 3 schematically illustrates a complete input projection data sequence 302 which spans a total scan duration of $T=t_{final}-t_0$, and includes a plurality of complete angular rotations of the radiation source and detector. The illustration shows a scan sequence which covers five complete rotations. However, in practice, the scan sequence may cover more than five rotations, or less than five rotations. For example, in some cases, a very high pitch scan with a wide detector may use less than one full rotation to image the whole of a particular organ (e.g. heart).

Figure 4:
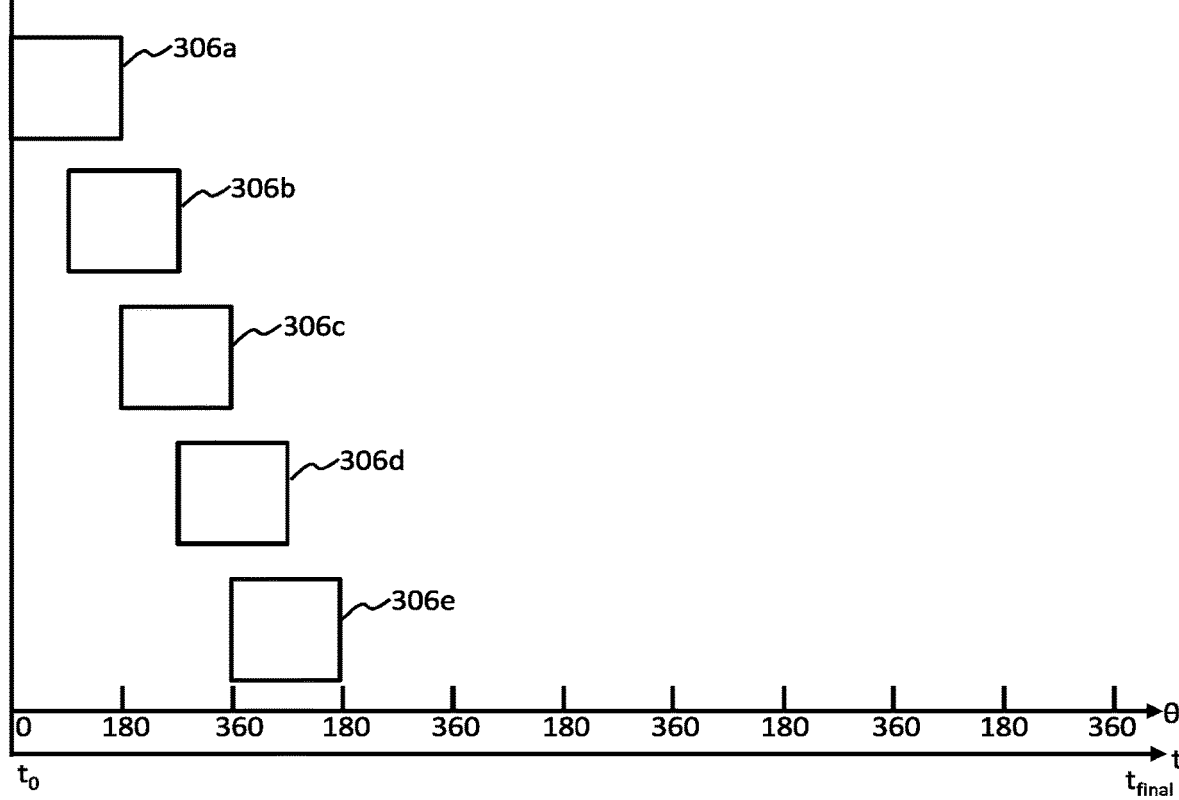
FIG. 4 schematically illustrates a plurality of data subsets of the complete projection data sequence, shown with respect to acquisition time and acquisition angle.

FIG. 4 schematically illustrates a plurality of example projection data subsets 306a-306e. Each data subset corresponds to a different respective slice through a scanned body. Each data subset comprises a portion of the projection data of the full projection data sequence 302. In particular, each comprises data corresponding to a particular range or span of acquisition angles relative to the scanned body (rotational positions of the source and detector relative to the body) and particular acquisition time range. In this example, the data subsets overlap temporally and angularly. For example, the projection data sequence 302 may be a data sequence obtained using a spiral imaging protocol, with a pitch greater than 1. However, the overlapping of the data subsets is not an essential feature, and the technical effects of the invention are not dependent upon this.

There are different options for performing the determination of the one or more sub-windows of visibility of the anatomical object or event.

According to at least one set of embodiments, the determinations of at least a portion of the one or more sub-windows of visibility may be identified based on an external sensor input related to the anatomical feature or event.

For example, the processing arrangement 140 may be arranged to receive a representation of an output signal generated by an external sensor adapted to sense one or more body parameters related to the anatomical event. The received signal corresponds to an output of the sensor over the course of the acquisition of the projection data, i.e. over the course of the CT scan. This may be received in real time as the data is acquired, or it may be a recorded representation of the sensor output recorded over a time period of the data acquisition. The one or more sub-windows associated with visibility of the anatomical event may be determined based on the input signal. For example, the processing arrangement may be adapted to determine a time window over which the anatomical event occurs based on the received signal.

By way of one example, the input signal may be a signal sourced from an ECG sensing arrangement, acquired simultaneously with acquisition of the projection data. An ECG sensor signal allows the heart phase over the course of the projection data acquisition to be determined. Based on this, the window of visibility of a particular heart phase for each of the slices may be determined.

An ECG sensor represents just one example. Other examples might include use of a sensor output sourced from a heart rate monitor. This also allows for detecting the heart phase. Another example may include use of an output from an ultrasound sensor, or from an ultrasound monitoring apparatus. This may have broader application to sensing movement phases of different possible anatomical objects. For example, it could track movement of the lungs, or of organs which undergo movement cycles due to application of pressure from movements of the lungs (e.g. the liver). Other examples may include an output from a PPG sensor, which can be used to track the breathing cycle of the lungs based on changing blood oxygen or pulse volume.

The processing arrangement may use the input indicative of the sensor output to determine a time window over which a given anatomical event (e.g. a certain heart phase) occurs.

In combination with, or alternatively to, use of an external sensor input, in further embodiments the processing arrangement may be adapted to determine one or more sub-windows within the received projection data within which are visible a particular anatomical object of interest. This may comprise the processing arrangement 140 performing a preliminary image reconstruction for one or more of the data subsets (for different slices) and determining based on the preliminary reconstruction a temporal or angular sub-window of the input projection data within which the anatomical feature or event is visible. This sub-window may span multiple different slices (i.e. multiple different of the data subsets may fall within its scope). The processing arrangement may perform a first pass full image reconstruction, wherein a preliminary reconstruction of the complete projection data sequence is obtained. This may comprise generating a reconstruction of each individual slice for example. The preliminary reconstruction may use the complete data range for each slice for example.

Image processing or analysis may be applied to the reconstructed image data obtained from the preliminary reconstruction. This may comprise applying, by way of non-limiting example, any one or more of: shape-matching algorithms, edge detection algorithms and image segmentation procedures (e.g. model based segmentation). These may be used to identify, within the reconstructed image data, boundaries or outlines of the anatomical object of interest. This may define a region of interest in the data, e.g. a 3D region of interest. Based on this, the temporal or angular window of the acquisition sequence within which the identified object lies may be identified. This temporal or angular window can then be used as at least one of the sub-windows of visibility used for selecting the data sub-ranges for each of the slices.

The image processing algorithms used for identifying the object of interest in the data may be stored on a local memory comprised by the processing arrangement, or may be retrieved by the processing arrangement by communication with a remote datastore, for instance using an input/output, or a communication module, e.g. a wireless communication module.

Once the one or more sub-windows of visibility of the anatomical object or event in the projection dataset have been identified, a sub-range of the projection data subset for each slice is selected. This is selected based on at least one of the one or more identified windows of visibility.

In different embodiments, there are different approaches to determining the sub-range. In at least one set of embodiments, the temporal (and angular) width or extent of the subrange selected from every data subset is fixed, and the determining the sub-range comprises only determining a positioning or alignment of the sub-range within the full data range for the slice data subset. For example, in a case in which the full projection data subset for each slice covers 180°, each selected data sub-range may have a fixed angular width of 150°. Naturally, if the full projection sequence 302 was acquired with a fixed table feed speed, then this will correspond also to a fixed temporal width of the data sub-range. Determining the temporal alignment of the selected sub-range within each slice data subset may be performed based on knowledge of the temporal range covered by the one or more sub-windows of visibility of the anatomical object or event. The alignment of the sub-range may be selected so as to maximize temporal overlap between the selected data sub-range and at least one of the windows of visibility, or, where overlap is not possible, maximize temporal proximity to at least one of the windows of visibility.

Figure 5:
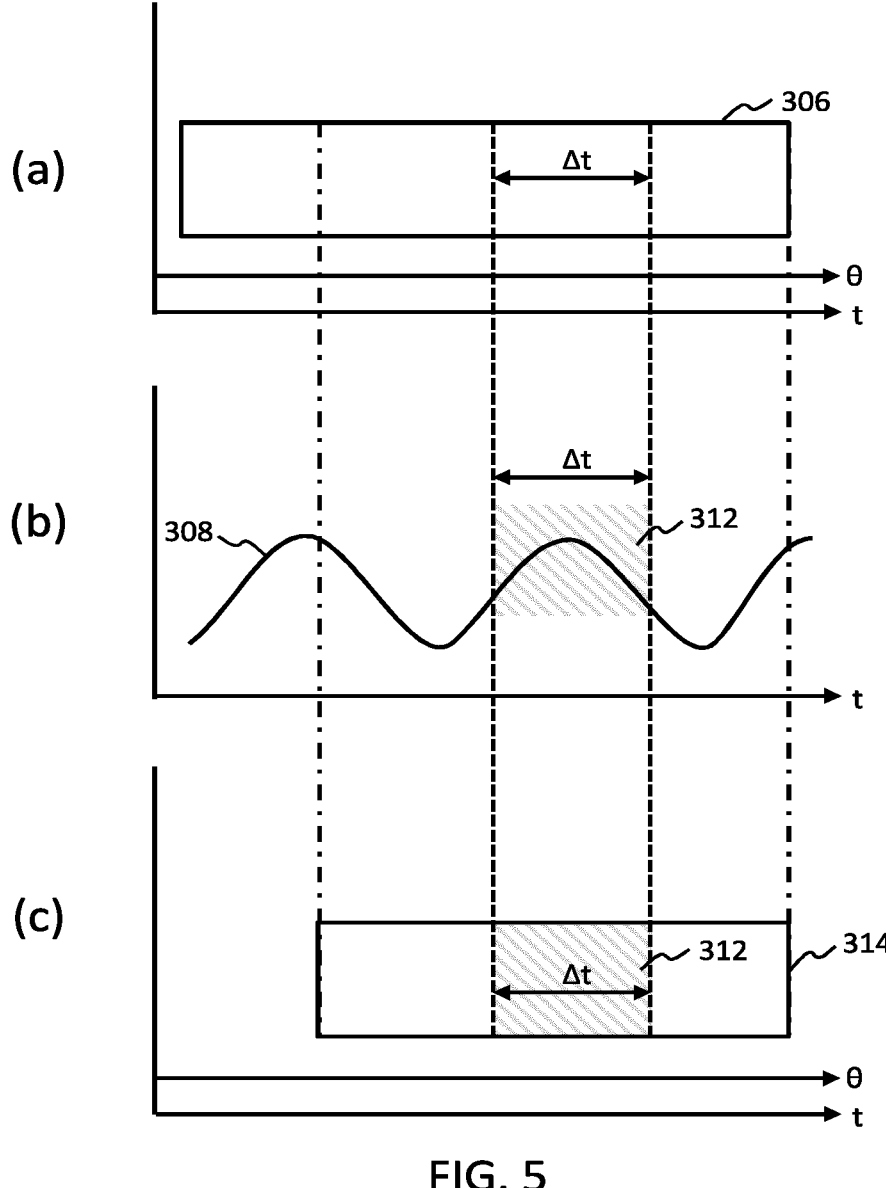
FIG. 5 illustrates identification of a sub-window of visibility of a given anatomical event, based on an input signal related to the anatomical event, and further illustrates selection of a sub-range of one example slice data subset based on the identified sub-window of visibility.

An example is schematically illustrated in FIG. 5. This shows one example projection data subset 306, corresponding to the data for a single slice through an imaged object.

FIG. 5(a) shows the data subset 306. FIG. 5(b) shows an example sensor signal 308, generated by an external sensor which is adapted to sense one or more body parameters related to an anatomical event. By way of example, the sensor signal may be an ECG sensor signal. FIG. 5(b) illustrates an example sub-window 312 which corresponds to a particular anatomical event, such as one phase of the heart cycle. The sub-window has a time span Δt within the total projection sequence. The time span covers a particular temporal portion of the data subset 306, and particular angular acquisition range AO. FIG. 5(c) illustrates selection of a particular sub-range 314 of the data subset 306, selected based on the identified temporal sub-window 312 of visibility of the anatomical event of interest. In this example, a sub-range is chosen which overlaps with the sub-window 312 of visibility, and which has the sub-window centrally aligned within the temporal span of the sub-range 314.

By way of example, the data sub-range 314 chosen for the particular slice may have a fixed temporal width, and wherein its temporal alignment within the full width of the data subset 306 is chosen so as to achieve maximal proximity between a temporal center point of the sub-range 314 and a temporal center point of the sub-window 312.

In some cases, the data subset for a given slice may not overlap with any of the one or more identified sub-windows of visibility of the anatomical event or object. For example, a data subset for a given slice might correspond to the data recorded temporally just before the anatomical event, e.g. the 180° chronologically before or after a target heart phase. In this example, a sub-range of the data subset may be chosen which is smaller than the complete range for the data subset, and which has a temporal alignment within the data subset which maximized temporal proximity to the temporally nearest window of visibility. For example, for slices recorded over 180° chronologically before the target anatomical event, the last 150° of the acquisition could be selected as the data sub-range for use in reconstruction.

Figure 6:
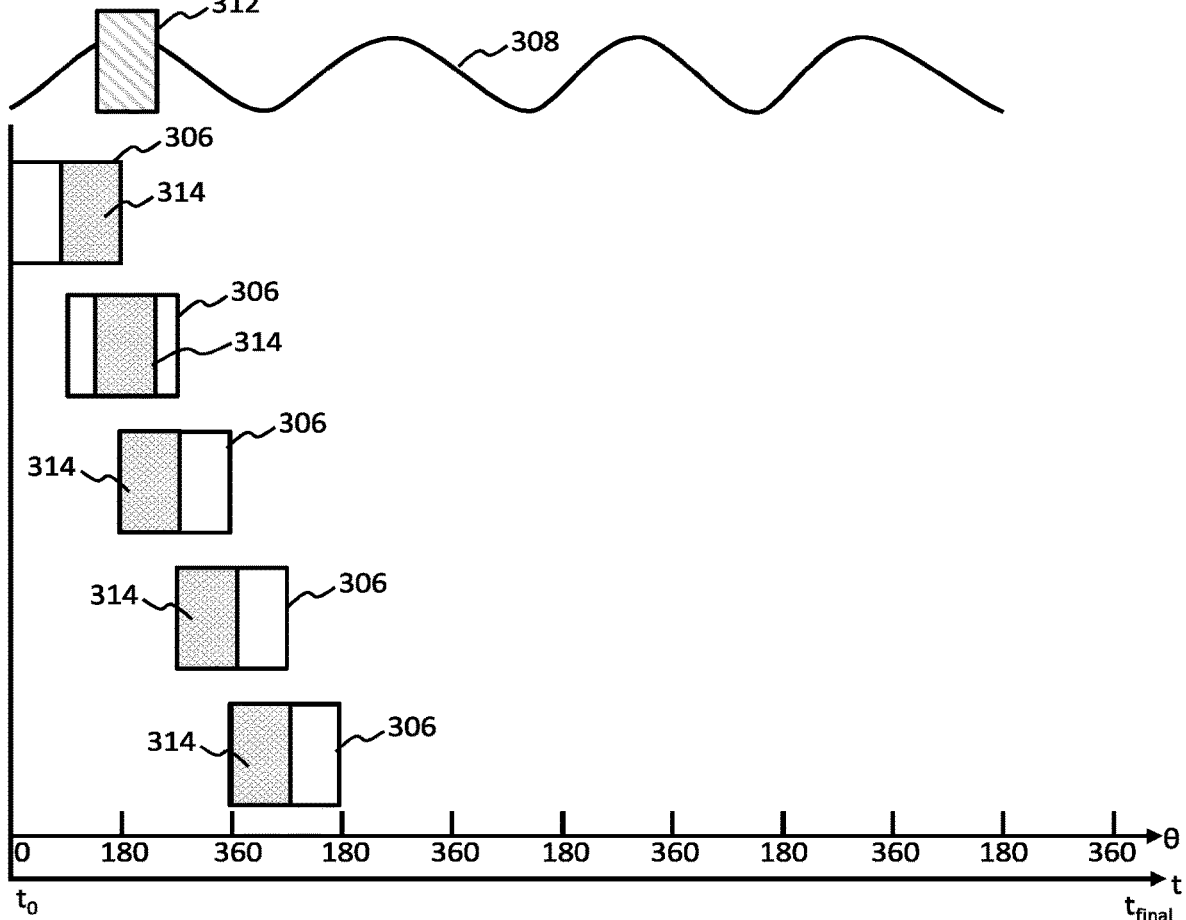
FIG. 6 shows selection of an example data sub-range for a plurality of data subsets, based on a common sub-window of visibility.

A further example is illustrated in FIG. 6. This shows an example signal 308 received from an external sensor measuring a physiological parameter related to an anatomical event of interest. An example sub-window 312 can be identified based the signal, the sub-window being associated with visibility within the corresponding temporal portion of the projection data sequence of the anatomical event. The anatomical event may for example be a phase of a movement cycle of an object, such as the heart. Also shown in FIG. 6 are a plurality of example projection data subsets 306, each comprising data corresponding to a different slice through the body. In this example, the data subsets overlap, but this is not essential. FIG. 6 shows example data sub-ranges 314 selected for each of the data subsets. Each sub-range is chosen to maximize overlap with the identified window 312 of visibility.

Although in the example of FIG. 6, all of the selected sub-ranges have the same width, this is not essential. In some embodiments, a width of the data sub-range selected for each slice data subset may be independently adjusted. This may be done for example based on a width of the identified sub-window of visibility. For example, each sub-range may have a width chosen based on maximizing temporal overlap with the window of visibility, but with the width maintained lower than a defined maximum.

In accordance with one set of embodiments, selecting the data sub-range for each slice may be performed based in part on the data sub-ranges selected for at least a portion of the other slices. For example, selecting the data sub-range for each slice may be based in part on maximizing temporal overlap or alignment of the sub-ranges selected for each slice. This ensures spatial consistency between slices. This may mean for example performing, for each slice, a first sub-step of determining whether exact temporal overlap between the data sub-range of the slice and a neighboring slice is possible, and, if so, a second sub-step of selecting the data sub-range for the given slice so as to be temporally overlapping with that of the neighboring slice. If it is not possible, an alternative sub-step is performed of identifying a sub-range which maximizes overlap with the sub-range of a neighboring slice. An example of this approach is schematically illustrated in FIG. 7, and will be explained in more detail in the paragraphs below.

As also mentioned above, the determining the one or more sub-windows of visibility of the anatomical object in the projection data may comprise performing a preliminary image reconstruction for one or more of the data subsets (of one or more of the slices). This may preferably be performed for all of the slices. Based on the preliminary reconstruction, one or more sub-windows of visibility within the input projection data set can be identified within which a given anatomical feature or event is visible.

Figure 7:
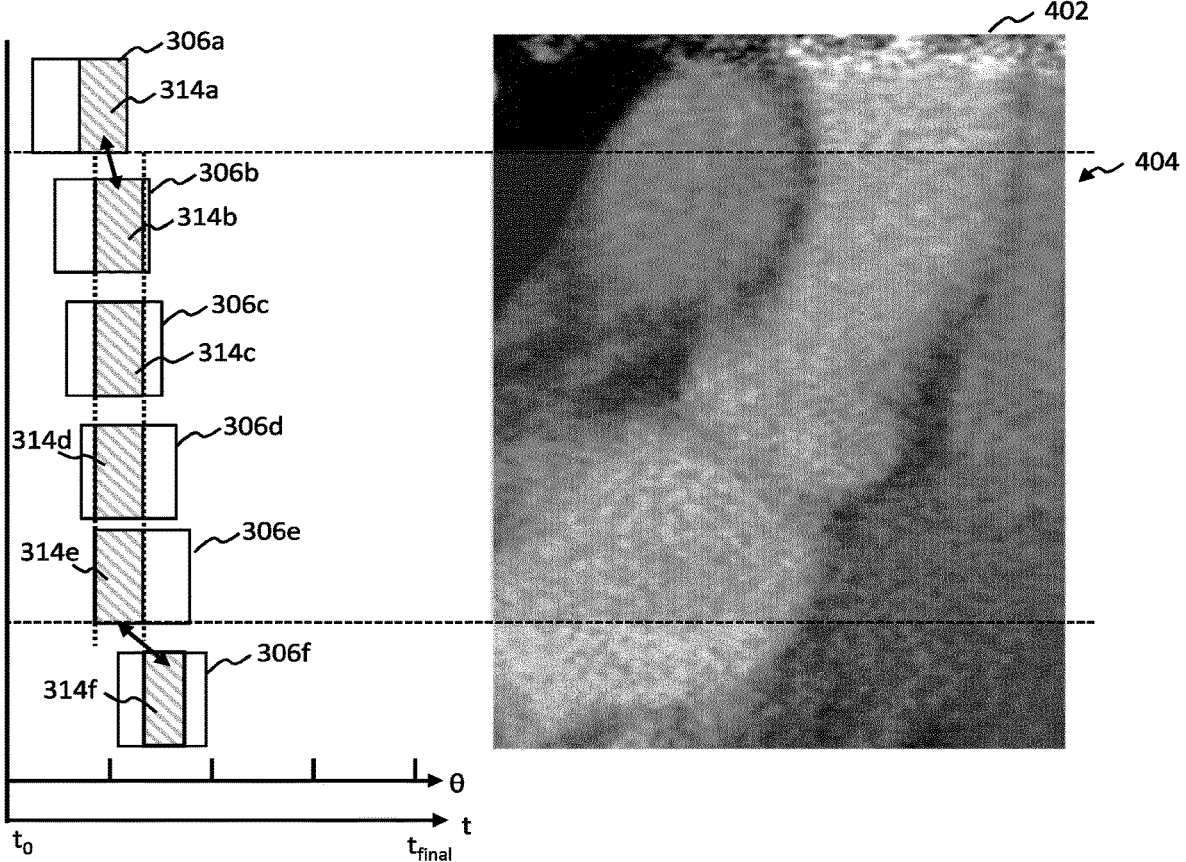
FIG. 7 shows selection of an example data sub-range for each slice, based at least in part on achieving temporal overlap between the selected data sub-ranges for the different slices.

This example approach is illustrated in FIG. 7 which shows a preliminary image reconstruction 402, generated based on the data subsets 306a-306f for a set of six slices. Image processing is applied to the initial reconstruction 402 to identify a target 3D anatomical region of interest (ROI) 404. This may for example be done based on image segmentation, e.g. model-based segmentation. By way of illustration, the region of interest 404 in this example corresponds to the aortic annulus.

A temporal sub-window of the input projection data sequence may then be identified whose boundaries are aligned with the boundaries of the identified region of interest 404.

The data sub-range 314 of each data subset 306 is chosen based on the initial reconstruction 402, and based on seeking to maximize temporal overlap between the selected sub-ranges for at least those slice data subsets 306 which lie within (or overlap with) the region of interest sub-window 404 (in this case, this is the subsets 306b-306e).

In some examples, a width (as well as temporal alignment) of each chosen data sub-range 314 may be configured based on the identified sub-window of visibility.

In some examples, the data sub-range 314 chosen for each slice, may be selected based on maximizing temporal proximity of the data sub-range with the data sub-ranges selected for neighboring slices in the region of interest. This could be done in an iterative or recursive process for the complete set of data subsets. This has the effect of minimizing movement artefacts between neighboring slices when reconstructed.

In addition to the positioning of the data sub-range 314, the width of the data sub-range may also be adjusted based on the identified anatomical sub-window of visibility. In some examples, the width of each data subset may be adjusted so as to be consistent with neighboring slices. This helps minimize motion artefacts between slices.

Additionally or alternatively, the width of the sub-range 314 of one or more of the data subsets 306 may be determined based on minimizing overlap with a sub-window of the data which includes a particular artefact identified in the first pass full data reconstruction. The width may further be influenced by one or more derived properties relating to the appearance or determined severity/magnitude of an identified motion artefact.

The data sub-ranges chosen for each of the slices whose data subsets 306b-306e lie within the identified region of interest 404 may be selected so as to maximize temporal overlap or temporal proximity between neighboring slices. For data subsets of slices 306a, 306f that lie outside of the region of interest 404, temporal non-overlap is acceptable, since artefacts in these (anatomically less relevant) regions is less significant.

In accordance with one or more embodiments, the temporal width of the data sub-range 314 selected for each data subset 306 may be configured based on a relative temporal proximity of the data subset from a nearest sub-window, or a degree of temporal overlap of the data subset with the nearest sub-window. There may be set a maximum and a minimal temporal or angular width of the sub-ranges, and wherein the width is selected to be proportional to the degree of overlap. By way of example, data subsets overlapping fully with a sub-window might use a maximal sub-range width, subsets not overlapping at all might use a minimal width, and subsets overlapping partially may use a width equal to the overlap range, so long as it is higher than the minimum and lower than the maximum.

As mentioned above, in accordance with one or more embodiments, after selecting the data sub-range for each data subset, image reconstruction may be applied to reconstruct each slice based on the data sub-range selected for each slice.

In some examples, possible artefacts caused by the reduced data range used for each slice may be compensated using compensation techniques. These may include application of neural-network based artifact compensation methods, or based on use of advanced reconstruction techniques such as iterative reconstruction. Briefly, iterative reconstruction is a reconstruction method more advanced than standard filtered back-projection. It is based on explicitly modelling the projection physics and using this to iteratively reconstruct images, forward-project them, correlate the forward-projected data to the actual raw data, and then continue with the next iteration of reconstruction. One example method for instance is outlined in the paper: Lossau Née Elss T, et al., Motion estimation and correction in cardiac CT angiography images using convolutional neural networks. Comput Med Imaging Graph. 2019 September; 76:101640.

Additionally or alternatively, one or more post-processing procedures may be applied to the reconstructed image data for reducing noise or artefacts. For example, filtering may be applied to the reconstructed image data.

For example, in accordance with one advantageous set of embodiments, the processing arrangement may be adapted to perform a filtering procedure as part of an image reconstruction process.

In particular, the processing arrangement may be adapted to perform a first image reconstruction of each of the slices using the complete data range of the data subset for each slice to derive a first image for each slice.

The processing arrangement may be further adapted to perform a second image reconstruction for each of the slices using the identified sub-range of the data subset for each slice to derive a second image for each slice.

The processing arrangement may be further adapted to apply low-pass filtering to each of the first images, and apply high pass filtering to each of the second images. A combined image is then generated for each slice comprising a combination of the filtered first and second images. An output is then generated indicative of the combined image for each slice.

This procedure is a based on a frequency split approach. The image reconstructed from the partial data has an improved temporal resolution, but is subject to limited-angle artifacts. Conversely, the image reconstructed from the full data has lower temporal resolution, but is free of limited-angle artifacts. The limited-angle artifacts typically have a significantly lower frequency (i.e. have larger spatial extent) than the motion artifacts. By adding a low-frequency part of the full-data reconstruction image to a high-frequency part of the partial-data reconstruction image, the different artifact types of each image are substantially filtered, and with the filtered image components then compensated by the addition of the other filtered image data. Thus, the temporal resolution is improved, and the limited-angle artifacts are substantially decreased.

As discussed above, one possible advantageous application of embodiments of the present invention is for cardiac CT imaging. By way of example, CT scans are often performed as part of regular management and monitoring of pacemakers. For example, it is often necessary to check on the status of pacing leads. In some examples, it can be necessary to extract a pacing lead, e.g. for replacement. In some examples, the pacing lead to be extracted may have grown into the wall of the superior vena cava (SVC). This adhesion can be difficult to detect in normal CT imaging due to movement artifacts causing blurring of the leads as visible in reconstructed images. The true position of the leads can be unclear.

Application of embodiments of the present invention can reduce the motion artefacts by narrowing the range of data used in each slice, thereby improving temporal resolution, reducing blurring and permitting improved lead localization. Additionally using techniques discussed above for achieving consistency between neighboring slices allows a lead to be tracked consistently through the 3D anatomical region of interest.

Examples in accordance with a further aspect of the invention provide a computer implemented method for use in x-ray computed tomography image reconstruction. The method may comprise performing the set of steps outlined in FIG. 2, and described above with reference to the processing arrangement 140 shown in FIG. 1.

In particular, the method comprises receiving 202 input projection data comprising a plurality of data subsets, each data subset corresponding to a different respective slice through a scanned body, and wherein each data subset comprises data corresponding to a defined range of acquisition angles, and a defined acquisition time period.

The method further comprises identifying 204 one or more temporal or angular sub-windows within the input projection data associated with visibility in the input projection data, if reconstructed, of a desired anatomical feature or event.

The method further comprises selecting 206 from the data subset for each slice a temporal or angular sub-range of the data, smaller than a complete range for each slice, wherein selection of the sub-range is based on at least one of the identified one or more temporal or angular sub-windows in the projection data.

The method further comprises generating 208 a data output indicative of the selected sub-range for each slice.

Examples in accordance with a further aspect of the invention provide a computer program product comprising computer program code, the computer program code being executable on a processor or computer. When the processor or computer is operatively coupled with a source of input projection data, such as a CT imaging apparatus or a datastore, the code is configured to cause the processor to perform a method in accordance with any example or embodiment outlined above or described below, or in accordance with any claim of this application.

Embodiments of the invention described above employ a processing arrangement. The processing arrangement may in general comprise a single processor or a plurality of processors. It may be located in a single containing device, structure or unit, or it may be distributed between a plurality of different devices, structures or units. Reference therefore to the processing arrangement being adapted or configured to perform a particular step or task may correspond to that step or task being performed by any one or more of a plurality of processing components, either alone or in combination. The skilled person will understand how such a distributed processing arrangement can be implemented.

The one or more processors of the processing arrangement can be implemented in numerous ways, with software and/or hardware, to perform the various functions required. A processor typically employs one or more microprocessors that may be programmed using software (e.g., microcode) to perform the required functions. The processor may be implemented as a combination of dedicated hardware to perform some functions and one or more programmed microprocessors and associated circuitry to perform other functions.

Examples of circuitry that may be employed in various embodiments of the present disclosure include, but are not limited to, conventional microprocessors, application specific integrated circuits (ASICs), and field-programmable gate arrays (FPGAs).

In various implementations, the processor may be associated with one or more storage media such as volatile and non-volatile computer memory such as RAM, PROM, EPROM, and EEPROM. The storage media may be encoded with one or more programs that, when executed on one or more processors and/or controllers, perform the required functions. Various storage media may be fixed within a processor or controller or may be transportable, such that the one or more programs stored thereon can be loaded into a processor.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

A single processor or other unit may fulfill the functions of several items recited in the claims.

The mere fact that certain measures are recited in mutually different dependent claims does not indicate that a combination of these measures cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems.

If the term "adapted to" is used in the claims or description, it is noted the term "adapted to" is intended to be equivalent to the term "configured to".

Any reference signs in the claims should not be construed as limiting the scope.

The invention claimed is:

1. A medical computed tomography (CT) device, comprising:
   a memory that stores a plurality of instructions; and
   a processor that couples to the memory and is configured to execute the plurality of instructions to:
      obtain an input CT projection data set comprising a plurality of data subsets, each subset corresponding to a different respective slice through a scanned body, and wherein each data subset comprises data corresponding to a defined range of acquisition angles, and a defined acquisition time range;
      identify at least one temporal or angular sub-window within the input projection data set associated with visibility in said data set, if reconstructed, of a desired anatomical feature or event;
      select from the data subset for each slice a temporal or angular sub-range of the data, smaller than a complete range for each slice, wherein selection of the sub-range is based on at least one of the identified at least one temporal or angular sub-window in the projection data;
      generate a data output indicative of the selected sub-range for each slice;
      perform a first image reconstruction of each of the slices using a complete data range of the data subset for each slice to derive a first image for each slice;
      apply low-pass filtering to each of the first images;
      perform a second image reconstruction for each of the slices using the identified sub-range of the data subset for each slice to derive a second image for each slice;
      apply high pass filtering to each of the second images;
      generate a combined image for each slice comprising a combination of the filtered first and second images, wherein generating the combined image for each slice comprises adding a low-frequency part of the first image reconstructed from the complete data range of the data subset to a high-frequency part of the second image reconstructed from the sub-range of the data subset; and
      generate an output indicative of the combined image for each slice.

2. The device as claimed in claim 1, wherein the processor is configured to:
   receive a signal generated by an external sensor configured to sense one or more body parameters related to an anatomical event, the signal corresponding to an output of the sensor over the course of the acquisition of the input projection data, and
   determine the at least one sub-window associated with visibility of the anatomical object or event based at least in part on the received signal.

3. The device as claimed in claim 1, wherein the determining the at least one sub-window in the input projection data set comprises performing a preliminary image reconstruction for the at least one data subset and determining, based on the preliminary reconstruction, the at least one sub-window within the input projection data set within which the anatomical feature or event is visible.

4. The device as claimed in claim 2, wherein the selected angular sub-range for each data subset has a pre-defined angular width, and the selecting the data sub-range for a given data subset comprises determining an alignment of the sub-range within the full width of the data subset.

5. The device as claimed in claim 4, wherein determining the alignment of the data sub-range is performed based on the signal generated by the external sensor.

6. The device as claimed in claim 1, wherein selecting the data sub-range for at least one data subset comprises determining an angular width of the data sub-range based on one of the at least one temporal or angular sub-window.

7. The device as claimed in claim 1, wherein the projection data is representative of an anatomical object of interest, wherein the object of interest undergoes cyclical movement, and wherein the anatomical event corresponds to a phase of the cyclical movement.

8. The device as claimed in claim 1, wherein selecting the data sub-range for each slice is performed based in part on the data sub-ranges selected for at least a portion of the other slices.

9. The device as claimed in claim 1, wherein selecting the data sub-range for each data subset is based in part on maximizing temporal overlap or temporal proximity of the angular sub-ranges selected for the different data subsets, and is based in part on maximizing temporal overlap or temporal proximity of the angular sub-range selected for the data subsets of neighboring slices.

10. The device as claimed in claim 1, wherein the processor is configured to extract the data sub-range selected for each respective slice from the data subset for the slice.

11. The device as claimed in claim 10, wherein the processor is configured to perform image reconstruction for each slice using only the extracted data sub-range of the respective data subset for each slice.

12. A computer implemented method for use in medical computed tomography (CT) image reconstruction, the method comprising:

Receiving an input CT projection data set comprising a plurality of data subsets, each subset corresponding to a different respective slice through a scanned body, and wherein each data subset comprises data corresponding to a defined range of acquisition angles, and a defined acquisition time range;

identifying at least one temporal or angular sub-window within the input projection data set associated with visibility in said data set, if reconstructed, of a desired anatomical feature or event;

selecting from the data subset for each slice a temporal or angular sub-range of the data, smaller than a complete range for each slice, wherein selection of the sub-range is based on at least one of the identified at least one temporal or angular sub-window in the projection data;

generating a data output indicative of the selected sub-range for each slice;

performing a first image reconstruction of each of the slices using a complete data range of the data subset for each slice to derive a first image for each slice;

applying low-pass filtering to each of the first images;

performing a second image reconstruction for each of the slices using the identified sub-range of the data subset for each slice to derive a second image for each slice;

applying high pass filtering to each of the second images;

generating a combined image for each slice comprising a combination of the filtered first and second images, wherein generating the combined image for each slice comprises adding a low-frequency part of the first image reconstructed from the complete data range of the data subset to a high-frequency part of the second image reconstructed from the sub-range of the data subset; and generating an output indicative of the combined image for each slice.

13. A non-transitory computer-readable medium for storing executable instructions, which cause a method to be performed for use in medical computed tomography (CT) image reconstruction, the method comprising:

Receiving an input CT projection data set comprising a plurality of data subsets, each subset corresponding to a different respective slice through a scanned body, and wherein each data subset comprises data corresponding to a defined range of acquisition angles, and a defined acquisition time range;

identifying at least one temporal or angular sub-window within the input projection data set associated with visibility in said data set, if reconstructed, of a desired anatomical feature or event;

selecting from the data subset for each slice a temporal or angular sub-range of the data, smaller than a complete range for each slice, wherein selection of the sub-range is based on at least one of the identified at least one temporal or angular sub-window in the projection data;

generating a data output indicative of the selected sub-range for each slice;

performing a first image reconstruction of each of the slices using a complete data range of the data subset for each slice to derive a first image for each slice;

applying low-pass filtering to each of the first images;

performing a second image reconstruction for each of the slices using the identified sub-range of the data subset for each slice to derive a second image for each slice;

applying high pass filtering to each of the second images;

generating a combined image for each slice comprising a combination of the filtered first and second images, wherein generating the combined image for each slice comprises adding a low-frequency part of the first image reconstructed from the complete data range of the data subset to a high-frequency part of the second image reconstructed from the sub-range of the data subset; and generating an output indicative of the combined image for each slice.

* * * * *